(12) United States Patent
Zlatintsis

(10) Patent No.: US 9,259,601 B2
(45) Date of Patent: Feb. 16, 2016

(54) RELEASE DEVICE

(75) Inventor: Chrysafis Zlatintsis, Lübeck (DE)

(73) Assignee: MINIMAX GMBH & CO. KG, Bad Oldesloe (DE)

( * ) Notice: Subject to any disclaimer, the term of this patent is extended or adjusted under 35 U.S.C. 154(b) by 851 days.

(21) Appl. No.: 13/397,870

(22) Filed: Feb. 16, 2012

(65) Prior Publication Data

US 2012/0211684 A1 Aug. 23, 2012

(30) Foreign Application Priority Data

Feb. 17, 2011 (EP) ..................................... 11154772

(51) Int. Cl.
| | |
|---|---|
| *A62C 37/36* | (2006.01) |
| *F16K 31/08* | (2006.01) |
| *F16K 17/38* | (2006.01) |
| *A62C 37/11* | (2006.01) |
| *F16K 11/07* | (2006.01) |
| *F16K 31/00* | (2006.01) |
| *A62C 37/40* | (2006.01) |

(52) U.S. Cl.
CPC ................. *A62C 37/36* (2013.01); *A62C 37/11* (2013.01); *F16K 11/07* (2013.01); *F16K 17/38* (2013.01); *F16K 31/004* (2013.01); *F16K 31/084* (2013.01); *A62C 37/40* (2013.01)

(58) Field of Classification Search
CPC ........ A62C 37/11; A62C 37/36; A62C 37/40; F16K 31/004; F16K 17/38; F16K 11/07; F16K 31/084

USPC ............... 169/60, 61, 42; 137/72–73; 251/65, 251/282, 129.01, 129.04, 129.03, 68, 325
See application file for complete search history.

(56) References Cited

U.S. PATENT DOCUMENTS

| | | | | |
|---|---|---|---|---|
| 1,629,102 A | * | 5/1927 | De Los ............................ | 169/42 |
| 2,248,798 A | * | 7/1941 | Wittmann ........................ | 251/65 |
| 2,324,428 A | * | 7/1943 | Roessner ......................... | 169/42 |
| 2,374,593 A | * | 4/1945 | Ernst et al. ............... | 251/129.07 |
| 2,457,499 A | * | 12/1948 | Santole ................................ | 74/2 |
| 2,674,324 A | * | 4/1954 | Mascarini ........................ | 169/26 |

(Continued)

FOREIGN PATENT DOCUMENTS

| | | | |
|---|---|---|---|
| DE | 19945856 B4 | * | 12/2005 |
| DE | 202011104314 | * | 1/2012 |

(Continued)

OTHER PUBLICATIONS

Raw Machine translation for DE 202011104314 "Boehmert".*

(Continued)

*Primary Examiner* — Mary McManmon
*Assistant Examiner* — David Colon Morales
(74) *Attorney, Agent, or Firm* — Harness, Dickey & Pierce, P.L.C.

(57) ABSTRACT

A detector (3) is provided that is independent of outside energy, for a release device, for which detector no battery and no external power supply is provided, and that generates a signal at a defined temperature, a thermal release element (3.2), at least one piezo element (3.1) and a coupling element (11) being arranged such in a bracket/housing (3.3) that as a result of a change in state of the thermal release element (3.2) by the coupling element (11) exerts a mechanical pressure on the piezo element (3.1) so that an electric signal is generated. A valve for a release device is also provided.

1 Claim, 6 Drawing Sheets

(56) References Cited

U.S. PATENT DOCUMENTS

| | | | | |
|---|---|---|---|---|
| 2,730,900 A * | 1/1956 | Rowley | | 74/2 |
| 2,836,198 A * | 5/1958 | McNeill | | 137/625.39 |
| 2,867,282 A * | 1/1959 | Bagno et al. | | 169/61 |
| 2,895,089 A * | 7/1959 | Leber | | 335/255 |
| 3,123,335 A * | 3/1964 | Darling | | 251/282 |
| 3,180,524 A * | 4/1965 | Shepard et al. | | 222/5 |
| 3,212,751 A * | 10/1965 | Hassa | | 251/65 |
| 3,288,224 A * | 11/1966 | Trudeau | | 169/19 |
| 3,291,216 A * | 12/1966 | Merrill | | 169/39 |
| 3,368,788 A * | 2/1968 | Padula | | 251/65 |
| 3,378,081 A * | 4/1968 | O'Reilly | | 169/19 |
| 3,379,214 A * | 4/1968 | Weinberg | | 137/625.5 |
| 3,458,769 A * | 7/1969 | Stampfli | | 361/147 |
| 3,568,775 A * | 3/1971 | Greenberg et al. | | 169/20 |
| 3,653,444 A * | 4/1972 | Livingston | | 169/5 |
| 3,683,239 A * | 8/1972 | Sturman | | 361/194 |
| 3,751,086 A * | 8/1973 | Geringer | | 292/144 |
| 3,814,376 A * | 6/1974 | Reinicke | | 251/65 |
| 3,821,967 A * | 7/1974 | Sturman et al. | | 137/624.15 |
| 3,863,720 A * | 2/1975 | Young | | 169/59 |
| 3,913,046 A * | 10/1975 | Davis et al. | | 337/13 |
| 3,955,186 A * | 5/1976 | Washburn et al. | | 137/78.4 |
| 3,967,141 A * | 6/1976 | Gawlick et al. | | 310/339 |
| 3,976,898 A * | 8/1976 | Newson | | 310/328 |
| 3,990,518 A * | 11/1976 | Hemme | | 169/60 |
| 4,055,829 A * | 10/1977 | Ruegsegger | | 337/416 |
| 4,071,042 A * | 1/1978 | Lombard et al. | | 137/332 |
| 4,159,744 A * | 7/1979 | Monte et al. | | 169/26 |
| 4,253,493 A * | 3/1981 | English | | 137/625.18 |
| 4,265,194 A * | 5/1981 | Sullivan | | 116/106 |
| 4,275,754 A * | 6/1981 | Lyons et al. | | 137/75 |
| 4,605,197 A * | 8/1986 | Casey et al. | | 251/30.01 |
| 4,612,845 A * | 9/1986 | Burkel et al. | | 91/448 |
| 4,664,150 A * | 5/1987 | Steiger | | 137/625.27 |
| 4,718,498 A * | 1/1988 | Davios et al. | | 169/62 |
| 4,738,314 A * | 4/1988 | Lee | | 169/42 |
| 4,750,705 A * | 6/1988 | Zippe | | 251/65 |
| 4,805,666 A * | 2/1989 | Araki et al. | | 137/625.43 |
| 4,946,009 A * | 8/1990 | Knutson | | 188/282.3 |
| 4,984,637 A * | 1/1991 | Finnigan | | 169/61 |
| 5,010,911 A * | 4/1991 | Grant | | 251/65 |
| 5,067,687 A * | 11/1991 | Patel et al. | | 251/129.08 |
| 5,108,070 A * | 4/1992 | Tominaga | | 251/65 |
| 5,267,721 A * | 12/1993 | Stroh | | 251/121 |
| 5,536,990 A * | 7/1996 | Nelson | | 310/339 |
| 5,584,465 A * | 12/1996 | Ochsenreiter | | 251/65 |
| 5,622,351 A * | 4/1997 | Kim | | 251/30.03 |
| 6,029,751 A * | 2/2000 | Ford et al. | | 169/60 |
| 6,039,124 A * | 3/2000 | Bowman et al. | | 169/61 |
| 6,116,276 A * | 9/2000 | Grill | | 137/596.17 |
| 6,129,115 A * | 10/2000 | Janssen et al. | | 137/625.65 |
| 6,189,624 B1 * | 2/2001 | James | | 169/61 |
| 6,286,604 B1 * | 9/2001 | Ou | | 169/56 |
| 6,491,110 B2 * | 12/2002 | Gil | | 169/43 |
| 6,772,562 B1 * | 8/2004 | Dadamo | | 52/1 |
| 6,955,226 B2 * | 10/2005 | Akins et al. | | 169/19 |
| 7,011,076 B1 * | 3/2006 | Weldon et al. | | 123/516 |
| 2005/0139366 A1 * | 6/2005 | Scheidt | | 169/60 |
| 2007/0007020 A1 * | 1/2007 | Chase | | 169/57 |
| 2007/0215362 A1 | 9/2007 | Rodgers | | |
| 2007/0240886 A1 * | 10/2007 | Kil et al. | | 169/39 |
| 2008/0041599 A1 * | 2/2008 | Mulkey et al. | | 169/60 |
| 2009/0159823 A1 * | 6/2009 | Matsunaga et al. | | 251/129.15 |
| 2009/0205593 A1 * | 8/2009 | Huang | | 123/90.11 |
| 2009/0250645 A1 * | 10/2009 | Imamura et al. | | 251/129.15 |
| 2009/0301601 A1 | 12/2009 | Enerson et al. | | |
| 2009/0321093 A1 * | 12/2009 | Lalouz | | 169/57 |
| 2011/0278029 A1 | 11/2011 | Newton | | |

FOREIGN PATENT DOCUMENTS

| | | | |
|---|---|---|---|
| EP | 0824027 A1 | | 2/1998 |
| GB | 1339923 A | * | 4/1971 |
| GB | 1545776 A | * | 5/1979 |

OTHER PUBLICATIONS

Raw Machine translation for DE 19945856 "Heinz".*

* cited by examiner

RELEASE DEVICE

CROSS-REFERENCE TO RELATED APPLICATIONS

This application claims the benefit and priority of European Patent Application No. 11154772.5, filed Feb. 17, 2011. The entire disclosure of the above application is incorporated herein by reference.

FIELD

The invention relates to a detector that is independent of outside energy, for a release device.

BACKGROUND

A release device is meant to be a device that starts an extinguishing operation in the case of a fire. This necessitates detectors that contain sensors or elements that detect a fire parameter and generate a signal for signaling, switching and control purposes, in particular for releasing an extinguishing device. Fire parameters are understood to be variables that are linked to the start or the spreading of a fire such as e.g. temperature, smoke, radiation, gas emissions and thermal decomposition products.

To release an extinguishing agent as a rule also necessitates valves that release the flow of the extinguishing agent to the place of the fire in the case of a fire.

The inventive solution can be used wherever a signal is to be generated at a defined temperature after a change in temperature for signaling, switching and/or control purposes and where no electric energy is available from a battery, a rechargeable battery or another power supply or is not available reliably or constantly. This can be the case for example with extinguishing devices such as extinguishing systems or devices for storing an extinguishing agent like a fire extinguisher, that is to be released by an energy-independent release device, or by other autonomous systems for monitoring. In this way an area that is at risk of fire can be monitored independently of outside energy, without a battery, without a rechargeably battery or another power supply, and when a defined temperature is exceeded a generated voltage or current signal can be used for signaling or controlling subsequent actions. This further enables overload protective devices to be realized that trigger when the desired temperature is exceeded and e.g. effect the switching off of an apparatus or emit a fault signal. In particular in autonomous units that must function as long as possible such as all types of vehicles, in space etc.

The detector that is independent of outside energy can further be used to protect kitchen appliances such as deep fryers and other fat-heating devices.

This detector can also be used to safeguard and monitor thermal processes, furnaces, engines, vehicles, aircraft and ships and other mobile and stationary objects.

The invention can also be applied where fluid media are present such as in the food, chemical and petrochemical industries, the drinking water and service water supplies and in other areas of industry.

In an advantageous design the fluid medium is an extinguishing agent, e.g. water, a water foam mixture, a gas or a chemical extinguishing agent.

Since some extinguishing agents also have a cooling effect, the term extinguishing agent is further also understood to mean a coolant.

The valve can be used in extinguishing systems and extinguishing devices where pressure tanks, assemblies, pipes or volume segments with extinguishing agents or coolants are closed off by a valve that opens when needed, e.g. on detecting a fire, as a result of an electric voltage or a voltage signal and releases the flow of the extinguishing agent.

DE 199 45 856 B4 describes a sprinkler device having a valve that opens on predetermined criteria, this valve being controlled by a sensor that reacts fast to parameters that are generated in the case of a fire, multiple sensors being provided that control the valve by means of an evaluation algorithm and the sensors being capable of reacting to different parameters of the fire. In a particular design variant the document describes a glass tube where a piezoelectric behavior is used to trigger an alarm. The current is supplied by means of an electric line and a battery.

EP 0 824 027 A1 describes an explosion protection device having an electric release, the release device being operated using a spring and a solenoid. The solenoid is fed electricity continuously. As soon as the power supply for the solenoid fails the spring relaxes so that a locking device is retracted that acts on a further mechanism. The device does not operate independently of energy and also is not suited to be arranged on an extinguishing device.

US 2009/0301601 A1 uses a piezo igniter that generates a spark voltage by triggering a press button as is known from every lighter, using which a combustion process is started whose exhaust gases can be used for further processes.

US 2007/0215362 A1 describes a fire extinguishing system where a cover plate having a fusible link is arranged at a fire extinguishing nozzle. Using a piezoelectric switch an alarm can be triggered. When a certain temperature is exceeded, the fusible link melts and the cover plate of the sprinkler housing falls down, a switch triggering an alarm in the process. In this document a device called a piezoelectric switch is used, this in reality being a piezoelectric acoustic signal transmitter.

US 2011/0278029 A1 describes an independent self-releasing modular fire suppression unit that can be mounted to a ceiling. On a printed circuit board a piezo element is situated that is triggered by a smoke detector and triggers an acoustic signal. A glass tube is disposed on a printed circuit board on a tank lid that bursts in heat. The glass tube acts against a spring and a switch that triggers an alarm signal. Batteries are provided for supplying power to the device.

A disadvantage with this state of the art is that the detectors and valves existing in release devices require additional outside energy such as e.g. batteries, rechargeable batteries or other external power supplies required. Thus detectors require additional outside energy both in the state of readiness in which they always have to detect fire parameters when they arise, and also in the release state after a fire parameter has been detected. It is also valves such as e.g. solenoid valves that require additional outside energy for maintaining the state of readiness and/or the release state.

SUMMARY

It is therefore the objective of the invention to develop a device that does not require any additional outside energy such as e.g. battery, rechargeable battery or another external power supply for maintaining the state of readiness and/or the release state.

This objective is achieved by a detector (3), that is independent from outside energy, for a release device, for which no battery, no rechargeable battery and no external power supply is provided and that generates a voltage or current signal at a defined temperature for signaling, switching or control purposes, a thermal release element (3.2), at least one piezo element (3.1) and a coupling element (11) are arranged in a bracket/housing (3.3) such that a change of state of the thermal release element (3.2) exerts mechanical pressure via the coupling element (11) on the piezo element (3.1) so that an electric signal is produced.

The inventive solution provides a detector for a release device that is independent of an outside energy detector that generates a signal for signaling, switching and/or control purposes as a result of changes in temperature. This may be a signal for an alarm, a signal for a fire detection and/or extinguishing control panel, for a release device such as a valve or another monitoring or safety device when a defined temperature is reached.

The inventive detector comprises at least one piezo element, a thermal release element, a coupling element and a housing and/or framework inside which all these components are functionally arranged.

The thermal release element is designed such that it is destroyed by thermal impact or changes its structure. It can melt, shrink or soften. It can also change its state of aggregation or its spatial dimensions. In this case the thermal release element is made of a material that changes its length in at least one spatial direction as a result of a change in temperature i.e. expands or shortens. Use of memory metals is likewise advantageous. It is advantageous if the release element is a liquid filled glass tube as it is used in sprinklers, a fusible link, a plastic element, a metal rod or a pyrotechnic element.

The coupling element exerts a force on the piezo element when the thermal release element changes its state at a defined temperature. This coupling element can be realized e.g. by pre-tensioned springs or other elastically deformed parts of force-transmitting parts such as push rods. The arrangement of the thermal release element, the coupling element and the piezo element in a housing/bracket is selected such that the stored potential energy of the spring or of the elastically deformed part is set free as a result of the change in state of the thermal release element and the resulting force exerts at a defined temperature a mechanical pressure on the piezo element and a voltage signal is generated by means of the piezo effect. The voltage that is generated can be several 100 V. It is advantageous to use several piezo elements that are connected mechanically in series and connected in parallel electrically.

The coupling element can also be an adhesive or an air gap so that the change in state of the thermal release element is transmitted directly to the piezo element and exerts thereon a force and a mechanical pressure.

When using thermal release elements that exhibit an increase in length or volume or a change in the state of aggregation at defined temperatures, this change in state of the thermal release element causes a force action directly via the coupling element to produce the mechanical pressure on the piezo element or indirectly via setting free the potential energy stored in the coupling element.

As the piezo element any material can be used that produces a piezo effect, e.g. piezoelectric crystals such as quartz, lithium niobate, gallium orthophosphate or piezoelectric ceramics such as lead zirconate titanates or lead magnesium niobates or thin layers of zinc oxide or aluminum nitride or plastics such as polyvinylidene fluoride.

The voltage generated by the piezo element can be used at connections or cables at the detector for signal processing or signal provisioning. Parts of the detector such as the frame can be designed as live parts so as to reduce the number of cable connections.

As an option an additional electric circuit can be used for charge amplification of the charges generated on the piezo element and/or further signal conditioning processes such as impedance matching to further signal use can take place.

The voltage signal is carried away from the piezo element via electrically conducting components of the detectors or cable and can be evaluated inside and/or outside the detector, e.g. by means of an electronic circuit provided for this purpose.

In a preferred design the voltage or current signal generated in the detector is conducted directly via a cable to an electrically controllable element. This can be a solenoid valve or an electrically deactivatable permanent magnet. Bistable relays or a remote-control switch for switching greater electric loads can also be imagined. Furthermore the voltage signal generated can control or ignite other release components such as pyrotechnical materials or explosives.

In a further preferred design, when a defined temperature is reached, the thermal release element causes the piezo element to generate a voltage that is conducted via a cable to an electrically deactivatable permanent magnet, thus eliminating or reducing the adhesive force of the magnet and moving a twin piston as a result of the spring force, thus opening a valve. The electrically deactivatable permanent magnet comprises the permanent magnet and a coil that serves to demagnetize the permanent magnet when a current flows through it. It is therefore a case of an electrically demagnetizable permanent magnet.

In a further preferred design, the detector sends an electric signal to a fire detection and/or extinguishing control panel. It is also conceivable to have another control or evaluation device that receives a signal from one or more sensors or detectors and evaluates it for control purposes such that devices can be controlled.

The inventive detector has the advantage that it does not require any outside energy in the form of batteries, rechargeable batteries or an external power supply, thus creating a release device for switching and control purposes that is reliable, remains effective over very long time spans, is cost effective and requires little outlay in terms of material.

The inventive solution also relates to a valve for a release device for controlling a pressurized fluid medium, comprising the housing, with the inflow socket and the outflow socket, the inflow and outflow sockets being connected via a duct.

A permanent magnet and a coil are arranged to produce the switching states of the valve. These components form an electrically deactivatable permanent magnet with electrical connections for applying a voltage.

According to the invention, an electrically deactivatable permanent magnet keeps the valve closed in the state of readiness via a twin piston counter to the force of a spring until an electric signal deactivates the permanent magnet.

In the further text the term state of readiness is used for that position of the valve that prevents the flow of the fluid medium, i.e. closes a container or a pipe segment or any volume segment.

The release state is understood to mean that valve position that releases the flow of the fluid medium, e.g. opens a pressure tank or releases the through flow in a volume segment of a device or in a pipeline.

Fluid media are understood to mean liquids and gases.

Deactivating the permanent magnet is understood to mean neutralizing the action of the permanent magnet, neutralizing the magnetic field or its attenuation, so that parts adhering to the permanent magnet are released.

The electrically deactivatable permanent magnet can be arranged in the valve housing. Advantageously it can also be arranged in a separate housing that can be removed. To this end, between the valve housing and the housing with the permanent magnet there is a connection like a bayonet, screw or a different connection know to the person skilled in the art.

The piston rod of the twin-piston valve can be magnetizable. It is also possible for there to be arranged between the twin piston and the permanent magnet a magnetizable disk or another magnetizable or magnetic element that can adhere to the permanent magnet. This can e.g. be a steel disk.

It is also possible for a snap ring to be present. It is furthermore advantageous to arrange a nonreturn valve, a seal and the connection for a pressure gauge, or a pressure gauge in the housing.

It can also be advantageous for the electrically deactivatable permanent magnet to be connected to a detector or a control device by means of a cable.

Over and above this it can be advantageous for the pistons of the twin piston to be of equal dimensions. Equal dimensions is understood to mean that the areas of the pistons on which the operating pressure of the fluid medium acts are of the same size, and as result the forces on the pistons in the twin-piston space compensate due to the physical correlation between pressure and area.

It is further advantageous for a longitudinal hole for relieving a leakage pressure to be arranged in the piston rod of the twin piston.

It is further advantageous for generation of the electric voltage or the voltage signal for releasing the electrically deactivatable permanent magnet to take place by a detector that is independent from outside energy, a control device or a fire detection and/or extinguishing control panel.

The electrically deactivatable permanent magnet is arranged in the valve housing, the twin piston adhering to the electrically deactivatable permanent magnet in the state of readiness, i.e. in the closed position.

In the state of readiness one piston of the twin pistons is arranged in the valve body between the entry and exit openings of the extinguishing agent and blocks a connecting duct between these. In the release state the magnetic field of the permanent magnet is neutralized or attenuated. As a result the piston rod directly adhering to the permanent magnet or the adhesion of the piston via a magnetic disk or another magnetic or magnetizable element is released. This piston is shifted by the relaxing spring such that the connecting duct becomes free and the fluid medium like a gas or liquid, preferably an extinguishing agent, can flow to the exit opening of the valve.

An advantage of the inventive valve consists in the fact that it can be used for any size of pressure range of the fluid medium that is present. The pressure range is only limited by the compressive strength of the valve design and the valve housing. The operating pressure of the fluid medium and its force action are of no influence on the dimensions of the valve closure (piston) and the strength of the required controlling force. An increase or decrease in the operating pressure has no effect on the position of the valve. In this valve the operating pressure of the fluid medium only acts in the twin-piston space, the pressure chamber, that is formed by two identical pistons coupled to each other. The forces of the operating pressure on the equally dimensioned pistons compensate and the valve can remain in the closed position for any increase in pressure and without any power requirement. The electric power for the switching process so as to achieve the release state is thus independent from the pressure of the fluid medium present.

The invention is to be explained in more detail below using exemplary embodiments and six figures. In the drawings:

DETAILED DESCRIPTION

Figure 1:
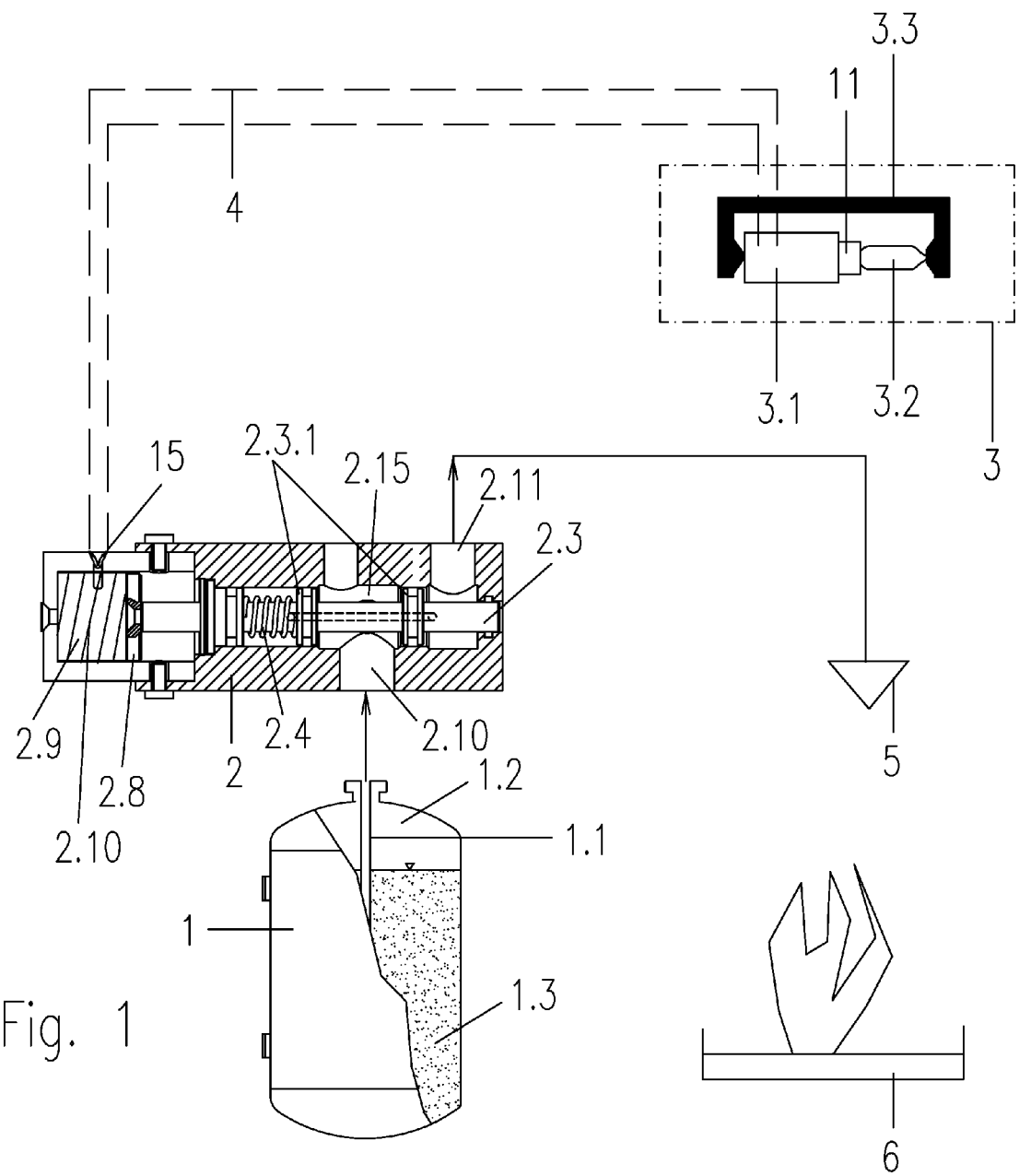
FIG. 1: shows a schematic representation of the release device with a detector that is independent of outside energy for controlling a valve of an extinguishing device.

FIG. 1 shows the detector 3 that is independent of outside energy and the valve 2 of the release device of an extinguishing device. The detector 3 comprises a piezo element 3.1, the thermal release element 3.2 and the coupling element 11 and the bracket or housing 3.3. The thermal release element 3.2 represents a sprinkler bulb or a fusible link. On reaching a defined temperature there arises a change in state of the thermal release element 3.2 and the sprinkler bulb bursts or the fusible link melts.

The arrangement of the thermal release element 3.2, of the coupling element 11 and of the piezo element 3.1 in the housing/bracket 3.3 is designed such that as a result of the change in state of the thermal release element 3.2 at a defined temperature a force or a mechanical pressure is exerted on the piezo element 3.1 via the coupling element 11 and a voltage signal is generated via the piezo effect.

The detector 3 is positioned above the protected object 6 so as to enable a signaling, control or switching process at a defined temperature, e.g. in the temperature range of 70 to 300 degrees Centigrade. In the present example the temperature range is in the range where a fire can start.

The cable 4 connects the connections of the piezo element 3.1 or of the detector 3 to the connections of the electrically releasable valve 2. The valve 2 closes the opening of the tank 1 for the extinguishing agent, in which the propellant gas 1.2 and the extinguishing agent 1.3 are situated. The riser 1.1 serves to discharge the extinguishing agent 1.3 via the valve 2 to the extinguishing nozzle 5 above the protected object 6. In the case of a fire, activation of the release device is via the thermal release element 3.2.

The voltage signal thus generated by means of the piezo element 3.1 is conducted via the cable 4 to the coil at the permanent magnet 2.9. The voltage that is applied for a short time is sufficient to neutralize or to attenuate the magnetic field of the permanent magnet 2.9 or its adhesive force. The twin piston on the piston rod 2.3 is moved into the opened valve position by the spring force of the compression spring 2.4. The extinguishing agent 1.3 that is permanently pressurized by a propellant gas 1.2 is conveyed via a riser 1.1 to the extinguishing nozzles 5 whereby the fire on the object 6 is extinguished.

In the position of operational readiness (valve closed) the twin piston adheres to the permanent magnet 2.9 by means of the steel disk 2.8. The compression spring 2.4 is in a tensioned position, the spring force is lower than the adhesive force of the permanent magnet 2.9.

In the pressure chamber 2.15 the pressure of the extinguishing agent acts on two equally dimensioned pistons 2.3.1. The pressure forces on both pistons 2.3.1 compensate each other. No resultant compressive force acts on the twin piston. The extinguishing agent 1.3 is situated in the pressure chamber 2.15 in a state of rest. Equal dimensions of the pistons 2.3.1 is understood to mean that the faces of the pistons on the pressure chamber 2.15 on which the operational pressure of the fluid medium acts are of the same size or approximately the same size, and that as a result of the physical correlation between force and area the forces on the two pistons 2.3.1 in the pressure chamber 2.15 compensate.

When the release device is activated, a voltage pulse coming from the at least one piezo element 3.1, is applied to the coil 10 on the permanent magnet 2.9 via the connections 15. As a result the adhesive force of the permanent magnet 2.9 is briefly neutralized or reduced and the force of the compressive spring 2.4 is released. The compression spring 2.4 moves the twin piston using the piston rod 2.3 into the open position and the extinguishing agent 1.3 can be guided from the inflow socket 2.10 via the duct that is now released, to the outflow socket 2.11 and to the nozzles 5.

Figure 2:
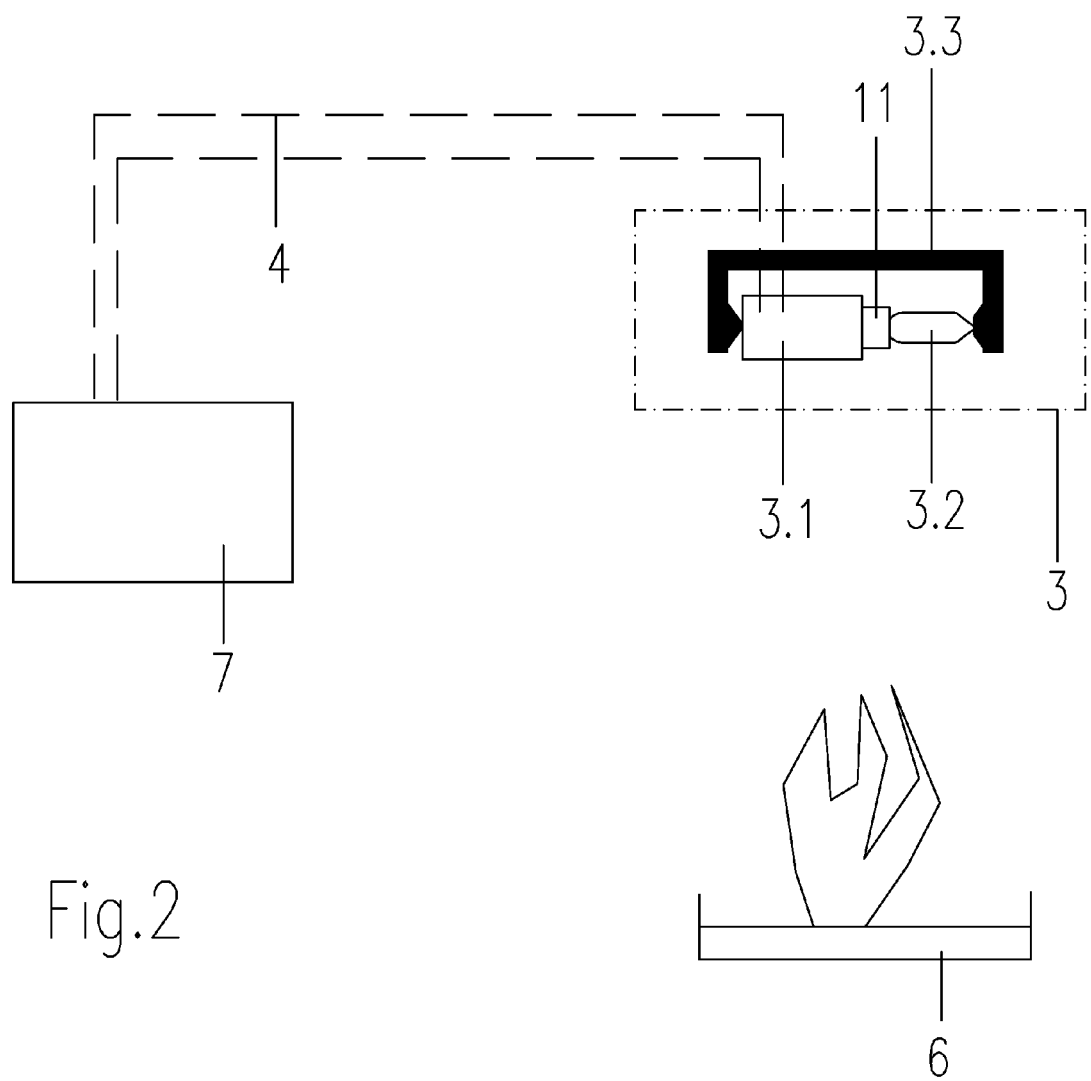
FIG. 2: shows a schematic representation of the detector that acts independently of outside energy with signal transmission to a fire detection and/or extinguishing control panel.

FIG. 2 shows a system having an evaluation or control device 7, in this case with a fire detection and control panel that receives the signal from the detector 3 in the case of a fire and/or then initiates the extinguishing process. The extinguishing device is not shown in this figure.

Figure 3:
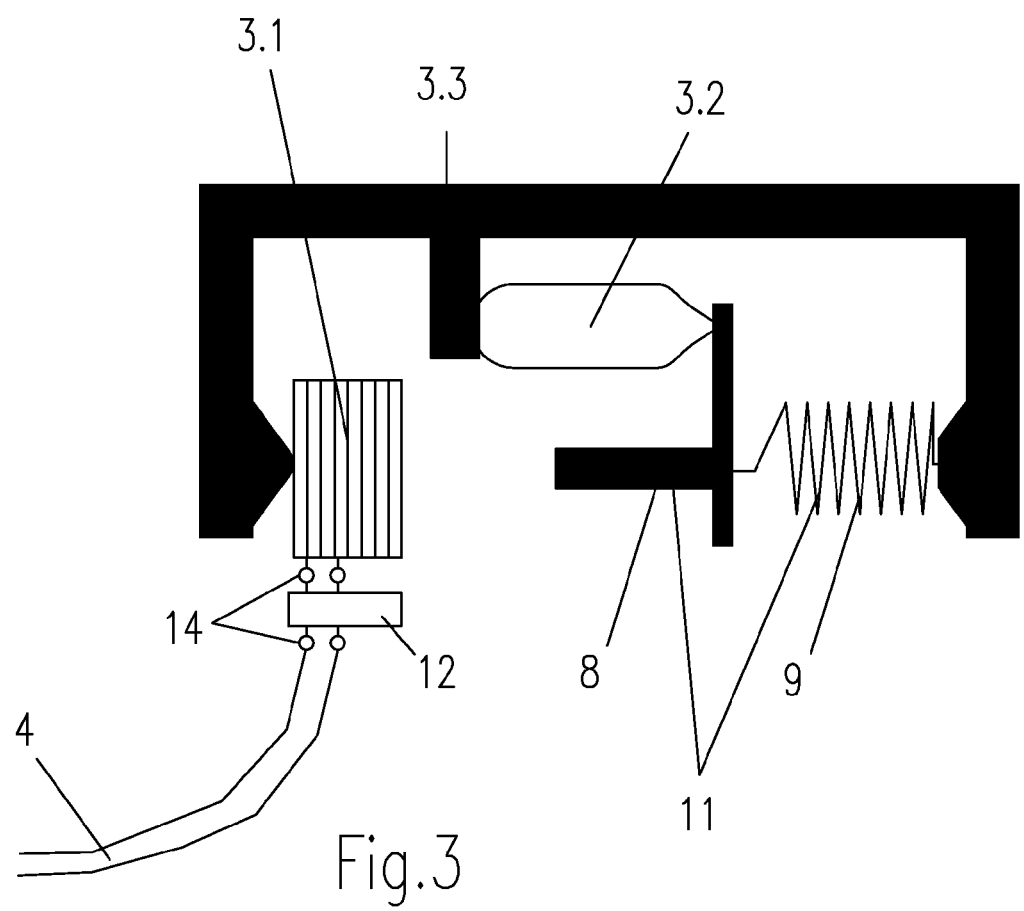
FIG. 3: shows a schematic representation of a detector that is independent of outside energy with a sprinkler bulb or a fusible link as thermal release element.

FIG. 3 shows the schematic representation of a detector 3 that is independent of outside energy with a sprinkler bulb or a fusible link as a thermal release element 3.2.

When a defined temperature is reached the sprinkler bulb bursts or the fusible link melts and releases the stored potential energy of the spring 9 and the push rod 8 is moved in the direction of the piezo element 3.1. Thus a force or a mechanical pressure is exerted on the piezo element 3.1 via the coupling element 11 that consists of the spring 9 and the push rod 8, it being possible to tap a voltage signal for signaling, switching or control purposes at the connections 14. By means of the electric circuit 12 charge amplification of the charges generated at the piezo element 3.1 takes place and/or further signal conditioning such as e.g. impedance matching to the further use of the signal.

Figure 4:
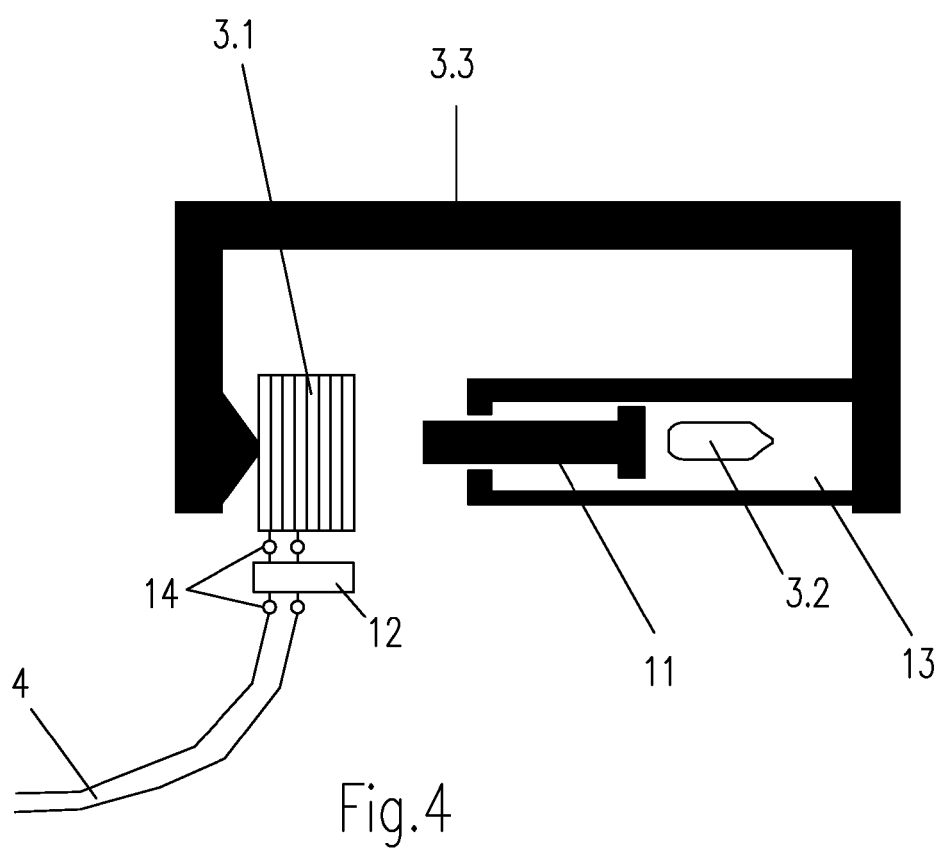
FIG. 4: shows a schematic representation of a detector that is independent of outside energy with a pyrotechnical element as thermal release element.

FIG. 4 represents a detector 3 that is independent of outside energy with a pyrotechnical element as thermal release element 3.2. The pyrotechnical release element 3.2 is arranged in a gas expansion space 13. When a defined temperature is reached, the pyrotechnical release element 3.2 ignites and creates a pressure surge in the gas expansion space 13 that acts on the coupling element 11 in the form of a push rod 8. By means of the coupling element 11 a force or a mechanical pressure is exerted on the piezo element 3.1, it being possible to tap a voltage signal for signaling, switching or control purposes at the connections 14. By means of the electric circuit 12 charge amplification of the charges generated at the piezo element 3.1 takes place and/or further signal conditioning such as e.g. impedance matching to the further use of the signal.

Figure 5:
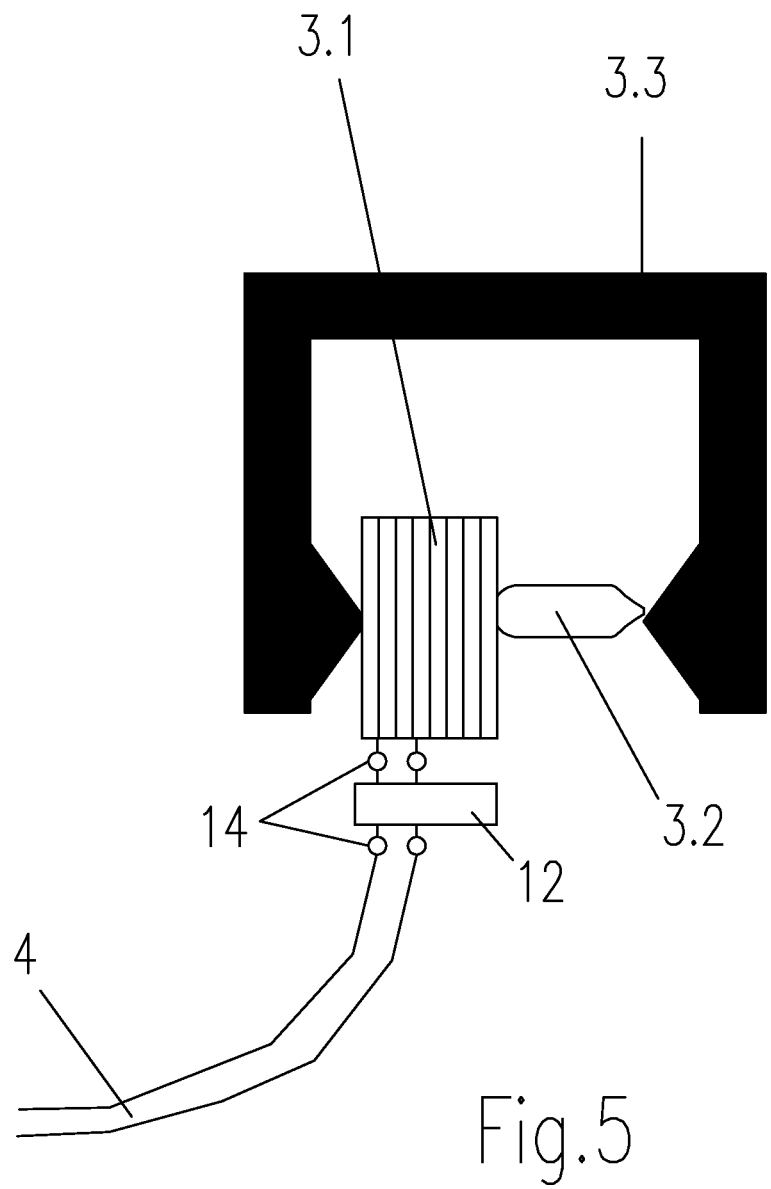
FIG. 5: shows a schematic representation of a detector that is independent of outside energy with a directly acting thermal release element.

FIG. 5 represents a detector 3 that is independent of outside energy with a pyrotechnical element or a memory metal element as thermal release element 3.2. This release element 3.2 is directly attached to the piezo element 3.1. When a defined temperature is reached the pyrotechnical element ignites or the memory metal element expands and creates a force or a mechanical pressure directly on the piezo element 3.1 and a voltage signal for signaling, switching or control purposes can be tapped at the connections 14. The coupling element 11 is in this case reduced to a contact face or fastening face or an air gap between the thermal release element 3.2 and the piezo element 3.1. In the present case, via the electric circuit 12 charge amplification of the charges generated at the piezo element 3.1 takes place and/or further signal conditioning such as e.g. impedance matching to the further use of the signal.

FIGS. 3 to 5 show how the arrangement of the thermal release element 3.2, the coupling element 11 and the piezo element 3.1 in the housing/bracket 3.3 is designed such that as a result of the change in state of the thermal release element 3.2 at a defined temperature a force or a mechanical pressure is exerted on the piezo element 3.1 via the coupling element 11.

Figure 6:
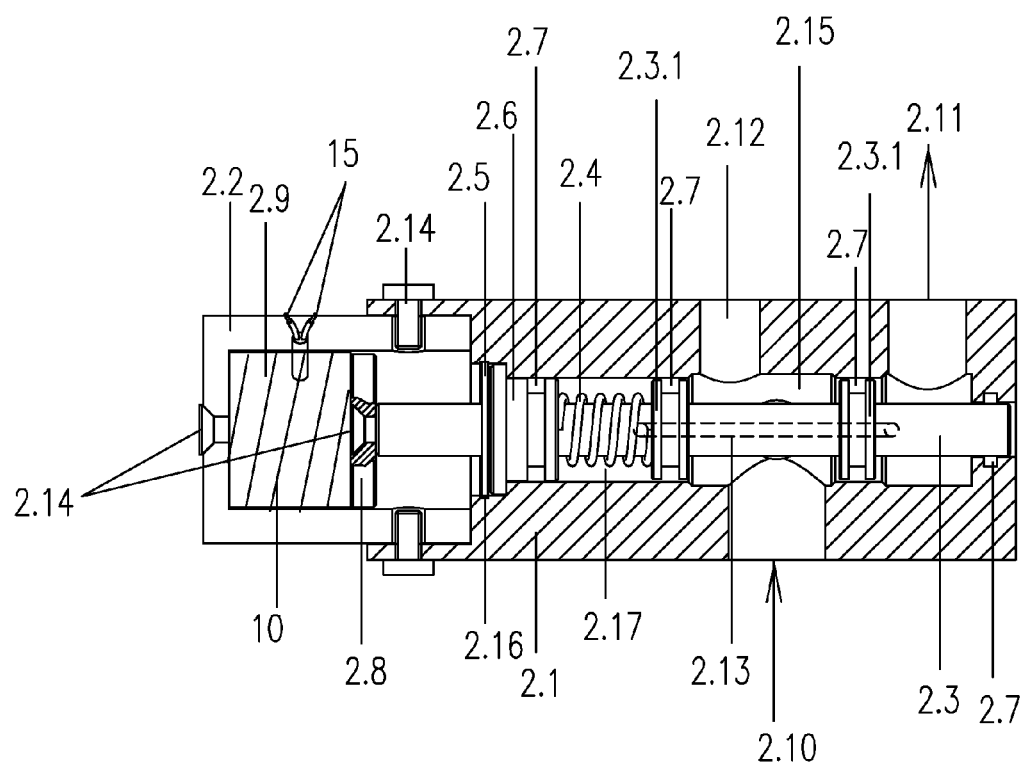
FIG. 6: shows a schematic representation of the valve of the release device.

FIG. 6 shows the inventive valve 2 for the release device, comprising the housing 2.1 with a twin piston, comprising two pistons 2.3.1 on a piston rod 2.3. The guide bush 2.6 guides the piston rod 2.3. The snap ring 2.5 is arranged in a groove 2.16. By means of the compression spring 2.4 the piston 2.3.1 can be tensioned against the guide bush 2.6. The disk 2.8 of magnetic material can be firmly connected to the piston rod 2.3. The permanent magnet 2.9 is surrounded by a coil 10 and provided with electric connections 15 for applying a voltage signal so as to demagnetize the permanent magnet 2.9. Furthermore the inflow socket 2.10, the outflow socket 2.11 and one or more connections for pressure gauges 2.12 are arranged in the housing 2.1.

In the position of operational readiness (closed position) the twin piston on the piston rod 2.3 is held by the permanent magnet 2.9 with one of its pistons 2.3.1 counter to the force of the tensioned spring 2.4. Via the magnetic element 2.8 the twin piston adheres to the permanent magnet 2.9. In the tensioned position the pistons 2.3.1 form a blocked pressure space 2.15 that communicates with the inflow socket 2.10 and the connections for the pressure gauges 2.12.

The pistons 2.3.1 and the guide bush 2.6 are sealed relative to the housing 2.1 with seals 2.7.

The magnet housing 2.2 with the permanent magnet 2.9, the coil 10 and the connections 15 is connected via screws 2.14 to the housing 2.1 of the valve.

As an alternative other fastenings means (not shown) can be used or the permanent magnet 2.9, the coil 10 and the connections 15 are arranged directly in or on the housing 2.1 of the valve 2.

A longitudinal hole 2.13 in the piston rod 2.3 connects the spring space 2.17 and the outflow socket 2.11 with each other. Thus these volumes can communicate. The hole 2.13 can relieve a leakage pressure in the spring space 2.17, created by a leakage at the seal 2.7 of the piston 2.3.1, into the open outflow socket 2.11 and faulty operation of the valve can be prevented.

By applying an electric voltage or a voltage signal to the connections 15 of the coil 10 a magnetic counter field is produced that neutralizes or attenuates the magnetic field of the permanent magnet 2.9 and releases the adhering twin piston with the magnetic disk 2.8. This moves the twin piston into the open valve position by the tensioned spring 2.4.

LIST OF REFERENCE NUMERALS 1 tank for extinguishing agent
1.1 riser
1.2 propellant gas
1.3 extinguishing agent
2 valve 2.3 piston rod
2.3.1. piston
2.4 compression spring
2.5 snap ring
2.6 guide bush
2.7 seal
2.8 steel disk
2.9 permanent magnet
2.10 inflow socket
2.11 outflow socket
2.12 socket for pressure gauges
2.13 hole
2.14 screws
2.15 pressure chamber
2.16 groove
2.17 spring chamber
3 detector
3.1 piezo element
3.2 thermal release element
3.3 bracket/housing
4 cable
5 nozzle
6 protected object
7 control cabinet
8 push rod
9 spring
10 coil
11 coupling element
12 electric circuit
13 gas expansion space
14 connection on the detection 3/on the piezo element 3.1
15 electric connection of the coil 10

The invention claimed is:

1. A release device for activating an extinguishing agent, comprising a detector (3) for which no battery, no rechargeable battery and no external power supply is provided and that generates a voltage or current signal at a defined temperature for signaling, switching or control purposes, a thermal release element (3.2), at least one piezo element (3.1) and a coupling element (11) are arranged in a bracket/housing (3.3) such that a change of state of the thermal release element (3.2) exerts mechanical pressure via the coupling element (11) on the piezo element (3.1) so that an electric signal is produced;

a valve (2) for controlling a pressurized fluid medium, preferably the extinguishing agent, comprising a housing (2.1) with an inflow socket (2.10) and an outflow socket (2.11), the inflow and the outflow socket (2.10, 2.11) being interconnected, wherein in the state of readiness an electrically deactivatable permanent magnet (2.9), that is surrounded by a coil (10), keeps the valve (2) closed by means of a twin piston with a piston rod (2.3) counter to a force of a spring (2.4) until an electric signal of the detector (3) that is produced when the change of state of the thermal release element (3.2) exerts mechanical pressure via the coupling element (11) on the piezo element (3.1), is delivered to the coil (10) to deactivate the effect of the permanent magnet (2.9) in the valve (2) and the twin piston opens the path of the extinguishing agent via the outflow socket.

* * * * *